(12) United States Patent
Ward

(10) Patent No.: US 10,143,337 B1
(45) Date of Patent: Dec. 4, 2018

(54) DEEP FRYER FILTER

(71) Applicant: Dewayne C. Ward, Sylva, NC (US)

(72) Inventor: Dewayne C. Ward, Sylva, NC (US)

( * ) Notice: Subject to any disclaimer, the term of this patent is extended or adjusted under 35 U.S.C. 154(b) by 226 days.

(21) Appl. No.: 15/187,289

(22) Filed: Jun. 20, 2016

Related U.S. Application Data

(60) Provisional application No. 62/181,845, filed on Jun. 19, 2015.

(51) Int. Cl.
*A47J 37/12* (2006.01)

(52) U.S. Cl.
CPC ....... *A47J 37/1223* (2013.01); *A47J 37/1257* (2013.01); *A47J 37/1285* (2013.01)

(58) Field of Classification Search
CPC ..... A47J 37/1223; B01D 35/26; B01D 36/02; B01D 35/0273
USPC ....... 99/408, 403, 407; 210/167.28
See application file for complete search history.

(56) References Cited

U.S. PATENT DOCUMENTS

| | | | |
|---|---|---|---|
| 3,616,907 A * | 11/1971 | Van Vleet | A47J 37/1223 210/167.28 |
| 3,646,882 A | 3/1972 | Keating | |
| 4,444,095 A * | 4/1984 | Anetsberger | A47J 37/1223 210/184 |
| 4,945,893 A | 8/1990 | Manchester | |
| 4,959,144 A | 9/1990 | Bernard et al. | |
| 5,247,876 A | 9/1993 | Wilson et al. | |
| 5,776,530 A | 7/1998 | Davis et al. | |
| 5,782,164 A | 7/1998 | Brintle | |
| 5,973,297 A * | 10/1999 | Winter | A47J 37/1223 219/439 |
| 7,566,468 B1 | 7/2009 | Oberlin et al. | |
| 2013/0183421 A1 | 7/2013 | Evraets et al. | |
| 2014/0373731 A1* | 12/2014 | Kelly | A47J 27/05 99/408 |

* cited by examiner

*Primary Examiner* — Reginald L Alexander
(74) *Attorney, Agent, or Firm* — Cramer Patent & Design, PLLC; Aaron R. Cramer

(57) ABSTRACT

A commercial deep fryer filter utilizes a tubular suction pump having a plurality of apertures which are in fluid communication with the oil reservoir and an air pump. At the distal end opposite the portion plurality of apertures is an opening which permits fluid communication between the suction pump and oil filter. The oil filter is in fluid communication with the oil contained in the commercial deep fryer.

8 Claims, 4 Drawing Sheets

DEEP FRYER FILTER

RELATED APPLICATIONS

The present invention is a continuation-in-part of, was first described in, and claims the benefit of U.S. Provisional Application No. 62/181,845 filed Jun. 19, 2015, the entire disclosures of which are incorporated herein by reference.

FIELD OF THE INVENTION

The present invention relates generally to the field of deep fryers for food and more specifically relates to a commercial deep fryer filter system.

BACKGROUND OF THE INVENTION

Individuals have many choices for ways to cook food in modern society. Modern fryers feature a basket to raise food clear of the oil when cooking is finished. Fryers often come with features such as timers with an audible alarm, automatic devices to raise and lower the basket into the oil, measures to prevent food crumbs from becoming over cooked, ventilation systems to reduce frying odors, oil filters to extend the usable life of the oil, and mechanical or electronic temperature controls. Deep fryers are used for cooking many fast foods, and making them crisp. No suitable filtering means is provided with conventional systems. This is not desirable.

Various attempts have been made to solve problems mentioned above. Among these are found in: U.S. Pat. Nos. and U.S. Pat. Nos. 6,364,120; 5,247,876; 2011/0288319; 6,412,401; and 3,646,882. These prior art references are representative of filters for use with fryers.

None of the above inventions and patents, taken either singly or in combination, is seen to describe the invention as claimed. Thus, a need exists for a reliable deep fryer filtration system, and to avoid the above-mentioned problems.

SUMMARY OF THE INVENTION

It is therefore an object of the present invention to provide a deep fryer having a filtering system adapted for use therewith. Alternately, the system can be designed to be used with an existing deep fryer body. In either embodiment, the invention includes a reservoir capable of holding a volume of fluid, such as a cooking oil, a filter holder capable of retaining a filter and capable of residing within the deep fryer body and located directly superjacent the reservoir, a collection drain tube in fluid communication with the reservoir, a delivery pipe in fluid communication between the collection drain tube and the filter holder, and an air pump capable of residing within the deep fryer body and in pneumatic communication with the delivery pipe. The reservoir is capable of being heated by a heating means for heating the fluid and also capable of receiving food to be cooked within the fluid. The air pump transfers a flow of air to the delivery pipe to induce a transfer of fluid from the reservoir onto the filter within the filter holder, and subsequently back into the reservoir.

In at least one (1) embodiment of the invention, a three-way valve is in fluid communication with the delivery pipe, the collection drain tube, and a drain tube for selectively transferring fluid from the reservoir to either the delivery pipe or the drain tube. The three-way valve and air pump in some embodiments are configured to reside within a lower cabinet portion of the deep fryer body. In some embodiments, the drain tube is flexible.

Another object of the present invention is to provide such an air pump that delivers a variable and selectable flow of air. In other embodiments, an air line in pneumatic communication between the air pump and an equilibrium fill line of the delivery pipe is capable of delivering the flow of air.

Another object of the present invention is to provide a second end of the delivery pipe to be a gooseneck and configured to reside outside of the deep fryer body.

Another object of the present invention is to provide such a reservoir having a trough located in a bottom longitudinal center thereof. The collection drain tube resides within the trough. In certain embodiments, the collection drain tube further includes a plurality of apertures.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

- 10 deep fryer filter system
- 11 power cord
- 12 air pump
- 15 delivery pipe
- 24 air line
- 30 food cooking basket
- 50 commercial deep fryer
- 55 heated oil tank
- 60 three-way ball valve
- 61 flexible drain tube
- 65 air flow rate control knob
- 70 collection drain tube
- 75 used (contaminated) cooking oil
- 80 valve handle
- 85 equilibrium fill point
- 90 air injection point
- 95 wire mesh filter basket
- 100 filter media
- 105 filtered (clean) cooking oil
- 110 drain hole
- 115 "V"-shaped trough
- 120 oil movement flow
- 125 disposal container
- 130 check valve
- 135 liquid/gas (oil/air) mixture

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Figure 1:
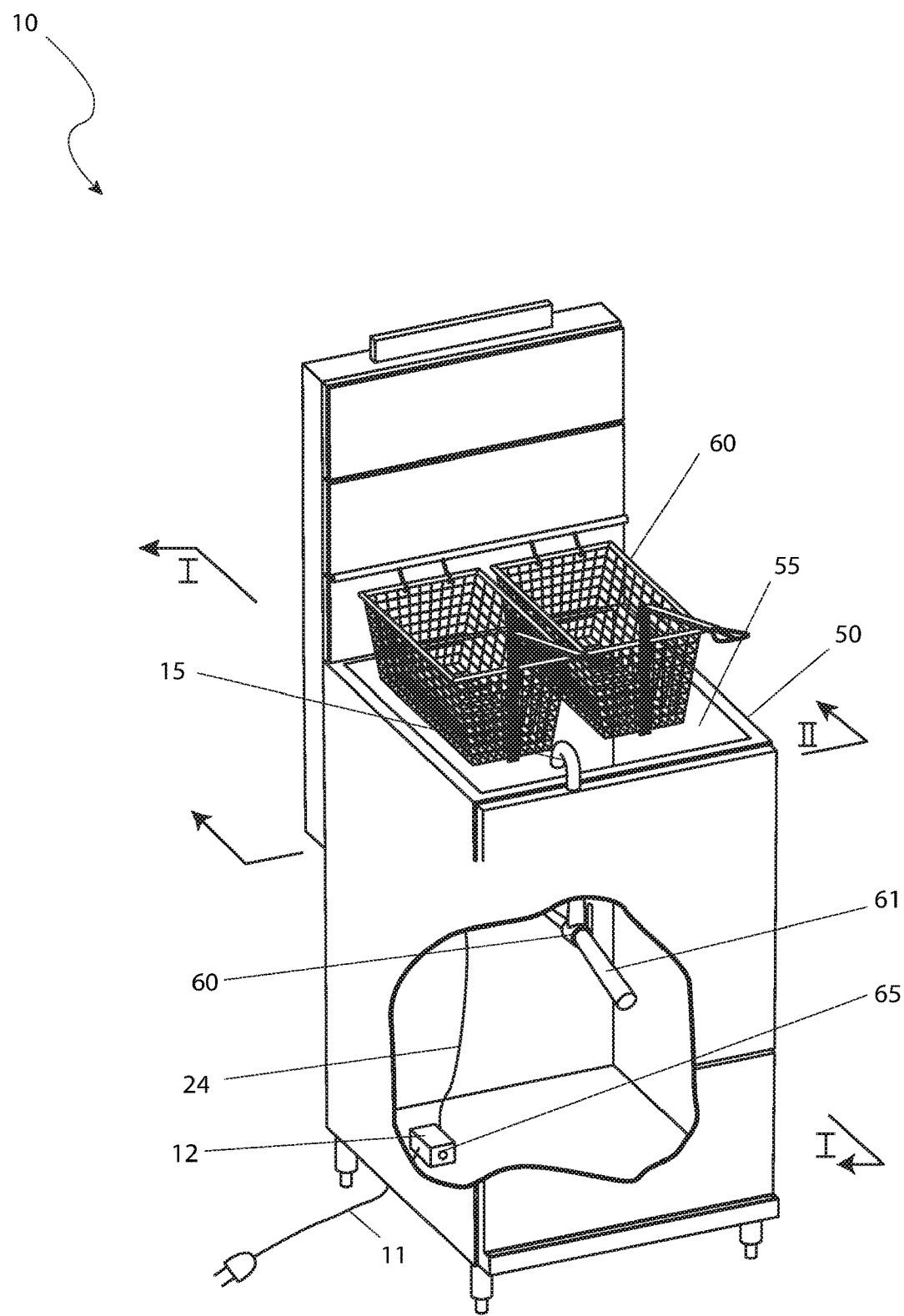
FIG. 1 is a perspective view of the deep fryer filter system 10 in a "ready-for-use" condition according to a preferred embodiment of the present invention.

Referring now to FIG. 1, a perspective view of the apparatus 10 in a "ready-for-use" condition according to a preferred embodiment of the present invention is disclosed. The deep fryer filter system 10 (herein described as the "system") 10, comprises of an otherwise conventional commercial deep fryer 50 as would be found in a restaurant or cafeteria environment. The exact make or model of commercial deep fryer 50 is independent of the functionality of the system 10 and is thus universal in nature. The specific depiction of any particular component, feature, or operation of the commercial deep fryer 50 is thus not a limiting factor of the present invention. The system 10 could be used with all gravity draining commercial deep fryers, including commercial or domestic, automatic or manual. The system 10 does not interfere with the existing controls and a retro fit kit could be produced to be installed into most thirty to fifty pound (30-50 lb) deep fryers. It is also envisioned that the system 10 could be utilized as an add-on kit to existing commercial deep fryer 50, currently in operation.

The commercial deep fryer 50 provides a heated oil tank 55 and a food cooking baskets 30, as would customarily be expected. A three-way ball valve 60, along with an air pump 12 and an air line 24 are visible in the lower cabinet portion of the heated oil tank 55 through a cutaway view. A flexible drain tube 61 is physically attached to the three-way ball valve 60. The air pump 12 is powered by a power cord 11 visible on the exterior of the commercial deep fryer 50. The air pump 12 is provided with an air flow rate control knob 65 that controls the rate of air flow from eight hundred to two thousand eight hundred cubic meters per minute (800-2800 m$^3$/min). The air pump 12 is envisioned as a reciprocating air pump diaphragm or piston type air pump such as the Maxima® R model rated at one hundred ten to one hundred twenty Volts (110-120 V), sixty Hertz (60 HZ), and four-and-a-half Watts (4.5 W). Finally, a delivery pipe 15 is visible on the forward portion of the heated oil tank 55. Further description and operation of the delivery pipe 15, the three-way ball valve 60, the air line 24, and the air pump 12 will be provided herein below.

Figure 2:
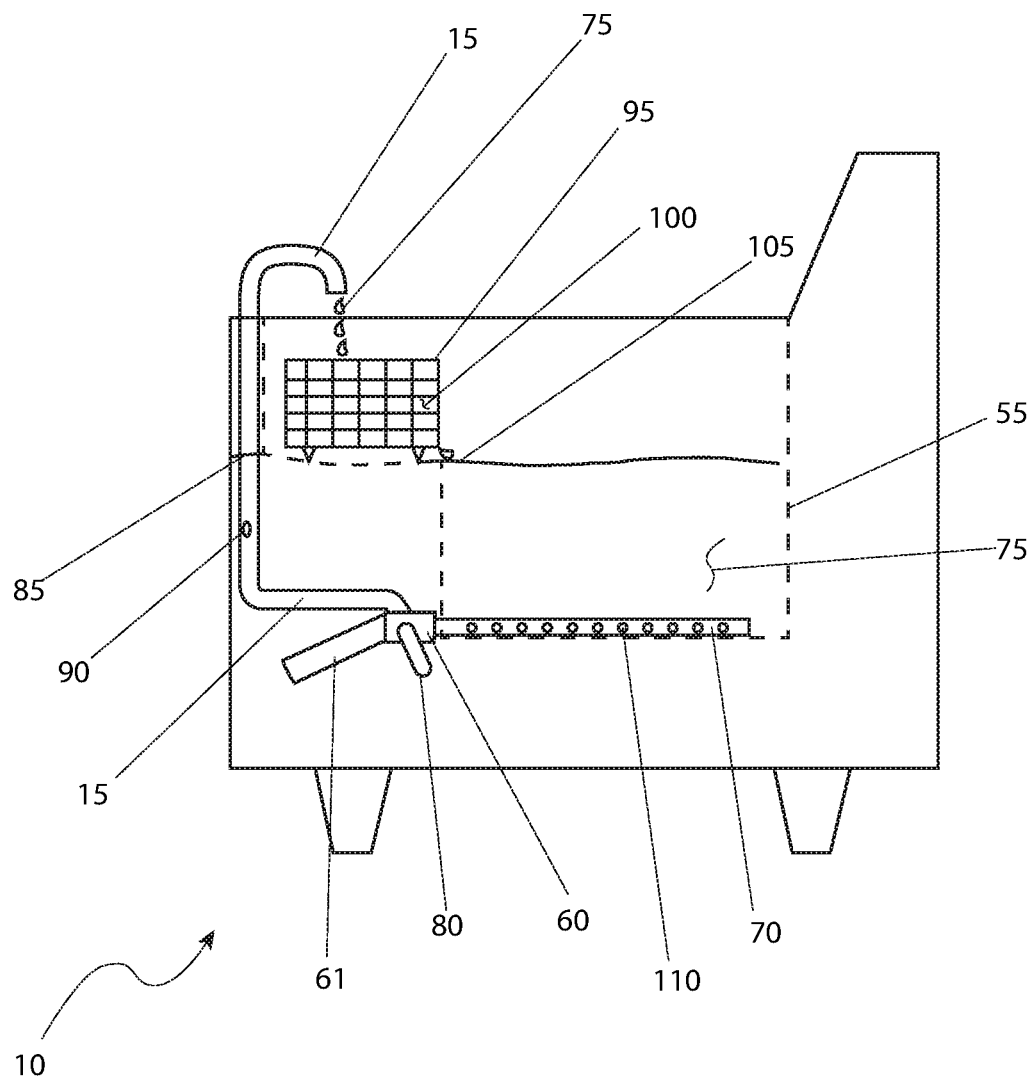
FIG. 2 is a section cut of the deep fryer filter system 10 as seen along a line I-I, as shown in FIG. 1, according to a preferred embodiment of the present invention.

Referring next to FIG. 2, a section cut-away view of the system 10 as seen along a line I-I, as shown in FIG. 1, according to a preferred embodiment of the present invention is depicted. Said cut-away view provides additional clarification on the interior components of the system 10 and their operation. A collection drain tube 70 is located in the bottom of the heated oil tank 55 and provides for the collection of used (contaminated) cooking oil 75. The output of the collection drain tube 70 is connected to the input of the three-way ball valve 60. One (1) output of the three-way ball valve 60 is connected to the flexible drain tube 61. The other output of the three-way ball valve 60 is connected to the lower portion of the delivery pipe 15. During normal operation of the apparatus 10, a valve handle 80 is positioned such that the used (contaminated) cooking oil 75 flows into the delivery pipe 15. As liquid will tend to normalize its level in relation to atmospheric conditions, the oil will fill the delivery pipe 15 up to an equilibrium fill point 85. An air injection point 90 is located beneath the equilibrium fill point 85. The air injection point 90 is connected to the distal end of the air line 24 (as shown in FIG. 1). As the injected air will rise through the delivery pipe 15, as subjected to ambient air pressure, the used (contaminated) cooking oil 75 will be carried up and out the distal end of the delivery pipe 15 as shown. The used (contaminated) cooking oil 75 will then flow via gravity into a wire mesh filter basket 95 lined with filter media 100. The filter media 100 is envisioned as standard edible oil filter paper, as would be used to manually filter cooking oil. As the used (contaminated) cooking oil 75 drains through and exits the wire mesh filter basket 95 it becomes filtered (clean) cooking oil 105. The filtered (clean) cooking oil 105 then falls via gravity into the heated oil tank 55 where it can be used to cook food stuffs in a continuous process. The only operational maintenance would be change the filter media 100 on a periodic basis, averaging every two hours (2 hr.) on an average use cycle. The system 10 will work with all types of cooking oil such as peanut oil, vegetable oil, soybean oil, or the like. The collection drain tube 70 is provided with a plurality of drain holes 110 to assist in draining of the used (contaminated) cooking oil 75. It is envisioned that the drain holes 110 are approximately one-quarter inch (¼ in.) in diameter and are located on approximately one inch (1 in.) centers on either side of the pipe. Said configuration allows approximately five gallons (5 Gal) of used (contaminated) cooking oil 75 to drain on a per minute (GPM) basis. Additionally, the size of the drain holes 110 allows the collection drain tube 70 to function as a filter to prevent large pieces of food stuff (contamination) to pass into the collection drain tube 70 where it will clog the delivery pipe 15.

Figure 3:
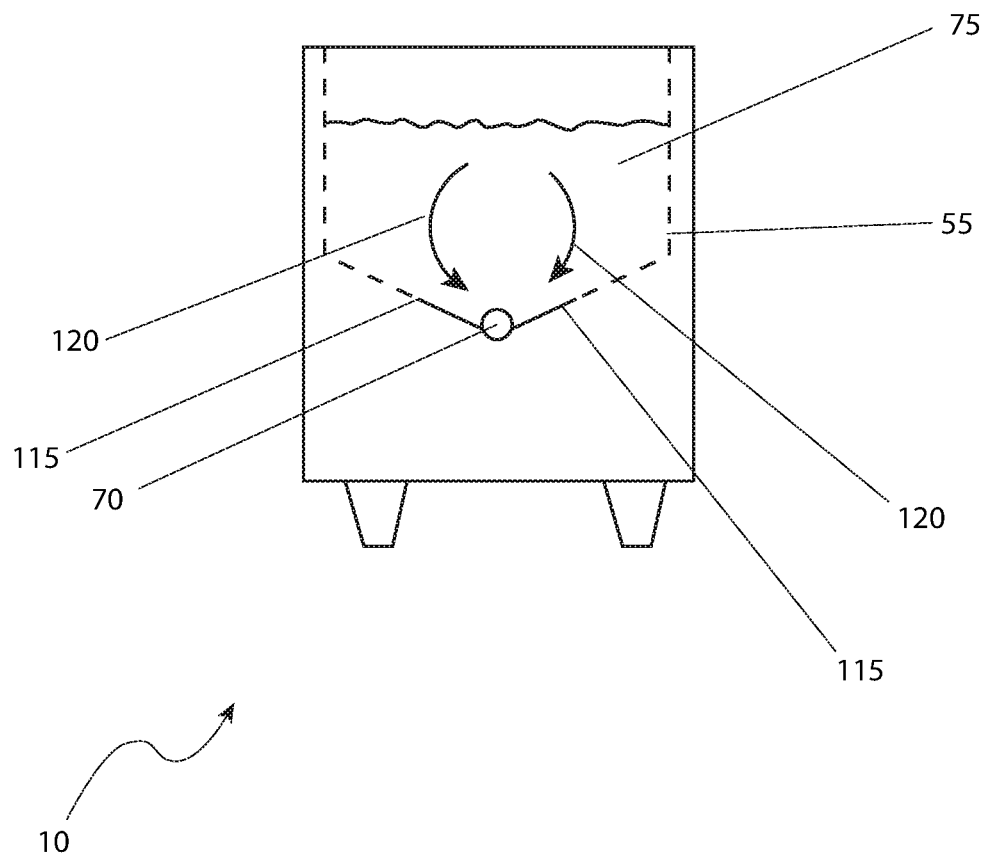
FIG. 3 is a section cut of the deep fryer filter system 10 as seen along a line II-II, as shown in FIG. 1, according to a preferred embodiment of the present invention; and, FIG. 4 is a process flow diagram depicting the major mechanical and electrical components of the deep fryer filter system 10 according to a preferred embodiment of the present invention.

Referring finally to FIG. 3, a section cut of the system 10 as seen along a line II-II, as shown in FIG. 1, according to a preferred embodiment of the present invention is shown. Said configuration clearly shows the collection drain tube 70 on the bottom of the heated oil tank 55 located in a "V"-shaped trough 115. Said "V"-shaped trough 115 allows for nearly complete drainage of the heated oil tank 55 during complete draining of the used (contaminated) cooking oil 75 and refilling with new fresh oil. Movement or flow of the used (contaminated) cooking oil 75 is depicted by oil movement flow 120 as the used (contaminated) cooking oil 75 is moved through the heated oil tank 55. Said movement ensures complete cycling of all used (contaminated) cooking oil 75 as filtered (clean) cooking oil 105 (as shown in FIG. 2) enters the heated oil tank 55.

Figure 4:
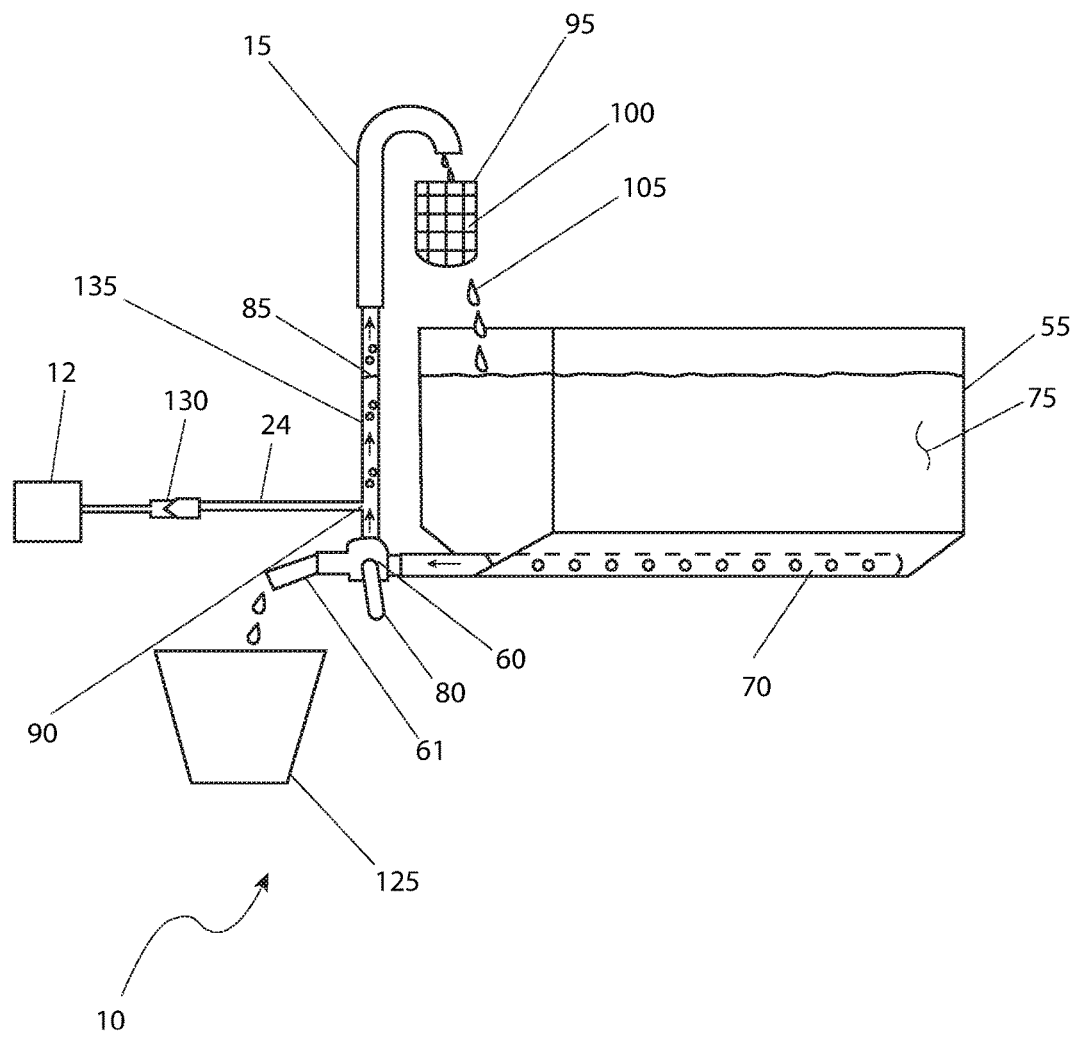

Referring finally to FIG. 4, a process flow diagram depicting the major mechanical and electrical components of the system 10 according to a preferred embodiment of the present invention is disclosed. Operation of the system 10 allows for two (2) major operating modes. In the first mode, the valve handle 80 of the three-way ball valve 60 is positioned to allow the used (contaminated) cooking oil 75 from the heated oil tank 55 to travel through the three-way ball valve 60 and the flexible drain tube 61 into a disposal container 125. Said mode allows for removal of all used (contaminated) cooking oil 75 at the end of its useful life cycle. The valve handle 80 of the three-way ball valve 60 would then be closed, allowing the heated oil tank 55 to be refilled with fresh oil. In the second of two (2) major operating modes, the valve handle 80 of the three-way ball valve 60 is positioned to allow the used (contaminated)

cooking oil 75 to flow into the delivery pipe 15 where it seeks its own level at an equilibrium fill point 85. Pressurized air from the air pump 12 travels through a check valve 130 and the air line 24 where it enters the delivery pipe 15 at the air injection point 90. Said injection action then produces a liquid/gas (oil/air) mixture 135 which travel up the remainder of the delivery pipe 15 whereupon it exits the delivery pipe 15. The air portion of the liquid/gas (oil/air) mixture 135 is then released to atmosphere allowing the remaining oil portion to fall into the wire mesh filter basket 95 equipped with the filter media 100. The filter media 100 then traps contamination and sediment behind allowing filtered (clean) cooking oil 105 to fall into the heated oil tank 55 via gravity. As is customarily expected, food stuffs are then cooked within the heated oil tank 55 whereupon the filtered (clean) cooking oil 105 again becomes used (contaminated) cooking oil 75 in a continual process.

The preferred embodiment of the present invention can be utilized by the common user in a simple and effortless manner with little or no training. It is envisioned that the apparatus 10 would be constructed in general accordance with FIG. 1 through FIG. 4. It is envisioned that the features of the apparatus 10 would be incorporated into newly manufacture commercial deep fryer 50, or incorporated as an add-on component to existing commercial deep fryer 50. During initial usage, the heated oil tank 55 is filled with fresh clean oil and heated to begin the food cooking process.

During normal food cooking operation, used (contaminated) cooking oil 75 flows through the three-way ball valve 60 into the delivery pipe 15 where air carries the oil up and into the wire mesh filter basket 95. The filter media 100 then cleans the used (contaminated) cooking oil 75 and returns filtered (clean) cooking oil 105 into the heated oil tank 55 to continue the cooking process in a continuous operation. The filter media 100 may be changed as it becomes filled. In this way debris is able to be efficiently removed from the used (contaminated) cooking oil 75 to maintain clean oil when delivered back to the heated oil tank 55 contacting the food stuffs being cooked, thus providing for better tasting fried food, and promoting longevity of the commercial deep fryer 50 in use.

Over time, the used (contaminated) cooking oil 75 can no longer be treated by the apparatus 10, thus requiring complete replacement of the cooking oil. This will necessitate the removal of all used (contaminated) cooking oil 75 from the heated oil tank 55 by placing the three-way ball valve 60 into a position that allows for used (contaminated) cooking oil 75 to be drained into the disposal container 125 through the flexible drain tube 61. After draining, the heated oil tank 55 is refilled with fresh oil which is reheated to a proper temperature allowing for the food cooking process to continue in a cyclical manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A deep fryer, comprising:
    a deep fryer body;
    a reservoir capable of holding a volume of fluid;
    a heating means for heating said fluid, configured to be in electrical communication with a power source;
    a filter holder residing within said deep fryer body and located directly superjacent said reservoir, said filter body capable of retaining a filter therein;
    a collection drain tube in fluid communication with said reservoir;
    a delivery pipe, having a first end in fluid communication with said collection drain tube and a second end terminating directly over said filter holder;
    an air pump residing within said deep fryer body, said air pump in pneumatic communication with said delivery pipe and configured to be in electrical communication with said power source; and,
    a three-way valve in fluid communication with said delivery pipe, said collection drain tube, and a drain tube for selectively transferring fluid from said reservoir to either said delivery pipe or said drain tube;
    wherein said air pump transfers a flow of air to said delivery pipe to induce a transfer of fluid from said reservoir onto said filter;
    wherein said reservoir is capable of receiving food to be cooked within said fluid;
    wherein said three-way valve and said air pump reside within a lower cabinet portion of said deep fryer body;
    wherein said drain tube is flexible;
    wherein said collection drain tube resides within a trough; and,
    wherein said collection drain tube further comprises a plurality of apertures.

2. The deep fryer of claim 1, wherein said air pump delivers a variable and selectable flow of air.

3. The deep fryer of claim 1, wherein said second end of said delivery pipe comprises a gooseneck and resides outside of said deep fryer body.

4. The deep fryer of claim 1, further comprising an air line in pneumatic communication between said air pump and an equilibrium fill line of said delivery pipe.

5. A filtering system adapted for use with a deep fryer body, comprising:
    a reservoir capable of holding a volume of fluid, capable of being heated by a heating means for heating said fluid;
    a filter holder capable of residing within said deep fryer body and located directly superjacent said reservoir, said filter body capable of retaining a filter therein;
    a collection drain tube in fluid communication with said reservoir;
    a delivery pipe, having a first end in fluid communication with said collection drain tube and a second end terminating directly over said filter holder;
    an air pump capable of residing within said deep fryer body, said air pump in pneumatic communication with said delivery pipe and configured to be in electrical communication with a power source; and,
    a three-way valve in fluid communication with said delivery pipe, said collection drain tube, and a drain tube for selectively transferring fluid from said reservoir to either said delivery pipe or said drain tube;

wherein said air pump transfers a flow of air to said delivery pipe to induce a transfer of fluid from said reservoir onto said filter;

wherein said reservoir is capable of receiving food to be cooked within said fluid;

wherein said three-way valve and said air pump reside within a lower cabinet portion of said deep fryer body;

wherein said drain tube is flexible;

wherein said collection drain tube resides within a trough; and, wherein said collection drain tube further comprises a plurality of apertures.

6. The deep fryer of claim 5, wherein said air pump delivers a variable and selectable flow of air.

7. The deep fryer of claim 5, wherein said second end of said delivery pipe comprises a gooseneck and resides outside of said deep fryer body.

8. The system of claim 5, further comprising an air line in pneumatic communication between said air pump and an equilibrium fill line of said delivery pipe.

* * * * *